(12) United States Patent
Oestreich

(10) Patent No.: US 6,719,562 B1
(45) Date of Patent: Apr. 13, 2004

(54) JAW MODEL

(76) Inventor: Gerd Oestreich, URB El Maquilishuat, Calle Jacaranda, Pasaje PG J4 No. 2 (SV)

( * ) Notice: Subject to any disclaimer, the term of this patent is extended or adjusted under 35 U.S.C. 154(b) by 67 days.

(21) Appl. No.: 10/088,370

(22) PCT Filed: Sep. 9, 2000

(86) PCT No.: PCT/DE00/03190

§ 371 (c)(1),
(2), (4) Date: Mar. 14, 2002

(87) PCT Pub. No.: WO01/22385

PCT Pub. Date: Mar. 29, 2001

(30) Foreign Application Priority Data

Sep. 17, 1999 (DE) .......................... 199 46 114

(51) Int. Cl.⁷ .............................................. A61C 11/00
(52) U.S. Cl. ...................................... 433/213; 434/264
(58) Field of Search ........................... 433/213, 74, 34, 433/60; 434/264, 263

(56) References Cited

U.S. PATENT DOCUMENTS

| 2,333,795 A | 11/1943 | Kellerman et al. |
| 2,669,779 A | 2/1954 | Zuccoli |
| 4,846,684 A | 7/1989 | Oestreich |
| 4,902,232 A | * 2/1990 | Neustadter .................. 434/263 |
| 4,969,820 A | 11/1990 | Oestreich |
| 5,222,891 A | 6/1993 | Poveromo |
| 6,257,895 B1 | 7/2001 | Oestreich |

FOREIGN PATENT DOCUMENTS

DE     29 916 978     1/2000

* cited by examiner

Primary Examiner—Kevin Shaver
Assistant Examiner—Melba Bumgarner
(74) Attorney, Agent, or Firm—Mark P. Stone

(57) ABSTRACT

A jaw model for demonstration purposes has interchangeable spare parts (4). The base (1) of the jaw model is provided with compartments (11) for storing the spare parts (4).

20 Claims, 2 Drawing Sheets

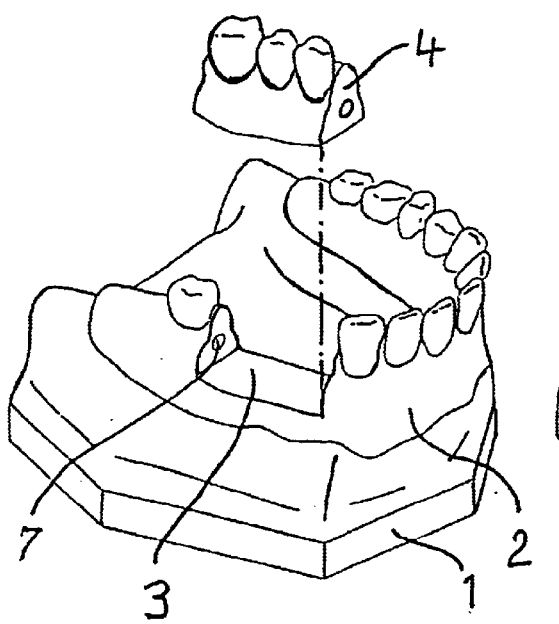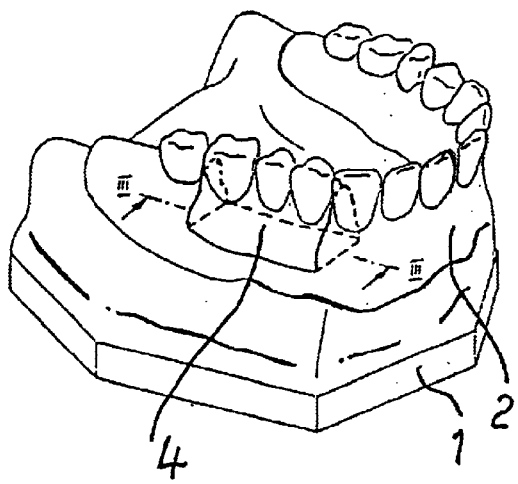
Fig. 1
Fig. 2
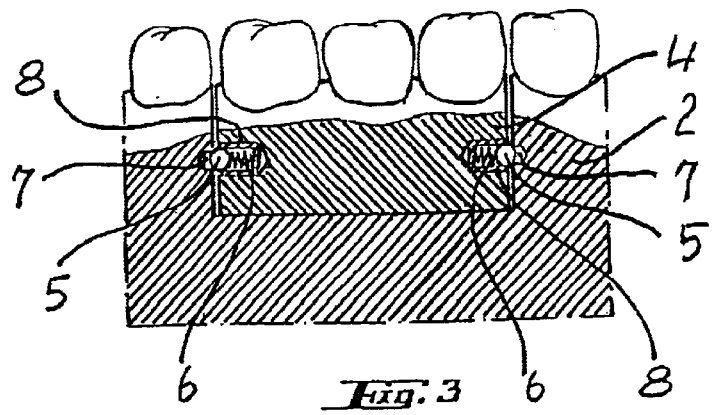
Fig. 3
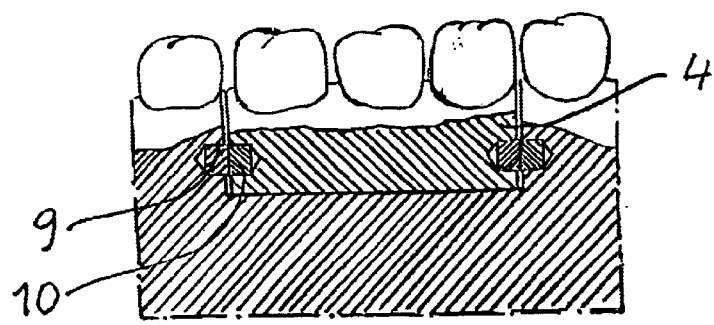
Fig. 4

JAW MODEL

TECHNICAL FIELD

The invention relates to a jaw model for demonstration of dental works and clinical pictures of teeth and partial dentures, with a jaw arch which is arranged on a base and has at least one recess for receiving an exchangeable insert part which forms a presentation piece.

PRIOR ART

DE 38 43 106 discloses a jaw model of the above type, in which the insert part is formed by an exchangeable individual tooth which has a preferably cylindrical pin which can be inserted into a bore in the jaw arch, and which is locked in the bore by a locking element formed by a spring. The known jaw model permits rapid exchange of different insert parts. However, it is not entirely satisfactory because the insert parts have to be stored in a separate container, which not only takes up extra room but can also be easily mislaid.

In a jaw model known from U.S. Pat. No. 5,222,891, individual teeth also form exchangeable insert parts which in this case are each provided with a guide bead which, for adjustment purposes, can be inserted into a groove provided on the jaw arch.

DESCRIPTION OF THE INVENTION

It is an object of the invention to remedy the shortcoming mentioned above, and to make available a jaw model which can be used not only for presentation purposes, but also as a container for a number of insert parts. According to the invention, in the case of a jaw model of the generic type in question, this object is achieved by the fact that the base is provided with storage compartments for further insert parts.

The jaw model according to the invention is easy to handle and makes it possible to securely accommodate a number of different insert parts in a very small space.

BRIEF DESCRIPTION OF THE DRAWINGS

Further features and details of the invention will become evident from the subclaims and from the following description of two illustrative embodiments which are shown in the attached drawing, where:

FIG. 1 shows a perspective view of a jaw model and of an insert part before its insertion into the model;

FIG. 2 shows the jaw model represented in FIG. 1 and the insert part which has been inserted into the latter;

FIG. 3 shows, on a larger scale, a cross section along the line III—III in FIG. 2;

FIG. 4 shows a cross section, corresponding to FIG. 3, through a modified embodiment;

EMBODIMENTS OF THE INVENTION

Figure 5:
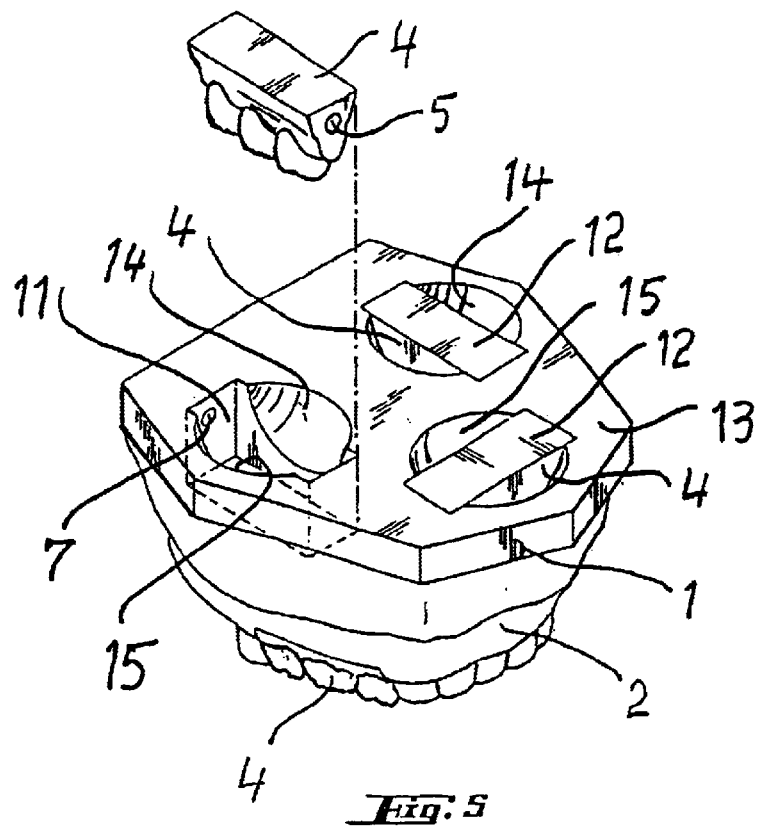
FIG. 5 shows the base of the jaw model according to FIGS. 1 and 2, provided with storage compartments for different insert parts.

In the figures, reference number 1 denotes the base of a jaw model whose jaw arch 2 is provided with a recess 3 for an insert part 4 which includes a group of three teeth. To secure the position of the insert part 4 in the position shown in FIG. 2, locking elements 5 are used which, in the embodiment according to FIG. 3, are formed by balls which lock, in each case under the action of a spring 6, into locking depressions 7 formed by bores. Instead of balls spring-mounted in bushings 8 with an inwardly flanged retaining edge, buffers 9, 10 made of rubber or another suitable plastic and forming a frictional closure can also be used for this locking. A corresponding embodiment is shown in FIG. 4.

As can be seen from FIG. 5, the base 1 is provided with a number of storage compartments 11 for additional insert parts 4 whose teeth are made of different materials, for example. To retain and lock the insert parts 4 in the storage compartments 11, the same locking elements are used as are used to retain and lock the insert element 4 in the jaw arch 2. The bottom surfaces 12 of the insert parts 4 accommodated in the storage compartments 11 are flush with the bottom surface 13 of the base 1. However, in order to be able to remove the insert parts without any problem, the bottom of the base 1 is equipped with grip depressions 14, 15 arranged on both sides of the long edges of the insert parts.

Figure 6:
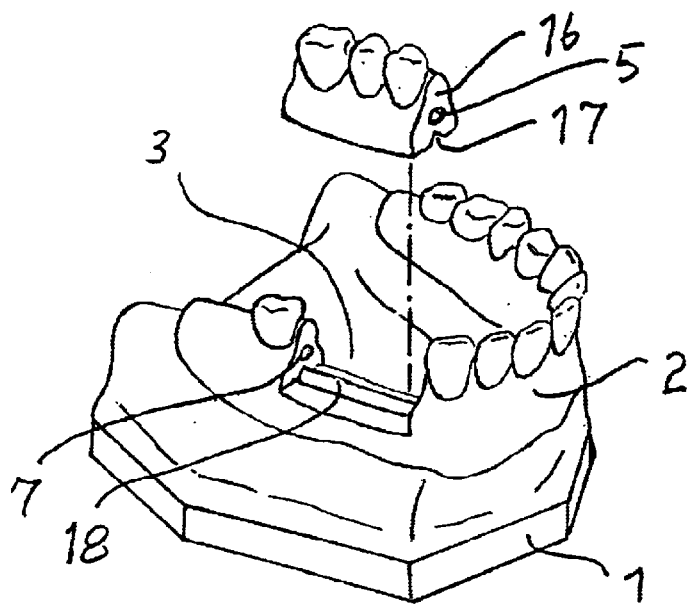
FIG. 6 shows a view, corresponding to FIG. 1, of a modified jaw model.

FIG. 6 shows a jaw model in which, for additional adjustment of an insert part 16, the bottom surface of the insert part is provided with a V-shaped groove 17 and a guide bead 18 adapted to the shape of the groove 17.

What is claimed is:

1. A jaw model parts insert parts for demonstration of different dental works and clinical presentations of teeth and partial dentures; said jaw model comprising a plurality of exchangeable insert parts a jaw arch arranged on a base, said jaw arch having at least one recess for receiving at least one of said exchangeable insert parts (4) representing one of said dental works or presentations, characterized in that an underside of said base (1), defines a plurality of storage compartments (11), said storage compartments (11) providing storage for further of said exchangeable insert parts (4) when said further exchangeable insert parts are not received in said recess of said jaw arch.

2. The jaw model as claimed in claim 1, characterized in that bottom surfaces (12) of said further exchangeable insert parts (4) received in said storage compartments (11) are flush with a bottom surface (13) of the base (1).

3. The jaw model as claimed in claim 2, characterized in that locking elements (5) are provided for releasably mounting each of said exchangeable insert parts (4) in said recess and in said storage compartments (11).

4. The jaw model as claimed in claim 3, characterized in that each of said exchangeable inserts parts (4) are provided with said locking elements (5) at opposite ends of each of said exchangeable insert parts (4).

5. The jaw model as claimed in claim 3, characterized in that each of said locking elements (5) is formed by a ball and a spring (6) exerting a resilient force on said ball for forcing said ball into a locking depression (7) defined in said recess (3) or in one of said plurality of storage compartments (11).

6. The jaw model as claimed in claim 3, characterized in that said locking elements (5) are formed by rubber buffers (9).

7. The jaw model as claimed in claim 2, characterized in that the bottom surface (13) of the base (1) is provided with grip depressions (14, 15) for facilitating gripping of said further exchangeable insert parts (4) in said storage compartments (11).

8. The jaw model as claimed in claim 1, characterized in that a bottom surface (13) of the base (1) is provided with grip depressions (14, 15) for facilitating gripping of said further exchangeable insert parts (4) in said storage compartments (11).

9. The jaw model as claimed in claim 1, characterized in that locking elements (5) are provided for releasably mounting each of said exchangeable insert parts (4) in said recess and in said storage compartments (11).

10. The jaw model as claimed in claim 8, characterized in that each of said exchangeable inserts parts (4) are provided with said locking elements (5) at opposite ends of each of said exchangeable insert parts (4).

11. The jaw model as claimed in claim 9, characterized in that each of said locking elements (5) is formed by a ball and a spring (6) exerting a resilient force on said ball for forcing said ball into a locking depression (7) defined in said recess (3) or in one of said plurality of storage compartments (11).

12. The jaw model as claimed in claim 9, characterized in that said locking elements (5) are formed by rubber buffers (9).

13. The jaw model as claimed in claim 9, characterized in a bottom surface (13) of the base (1) is provided with grip depressions (14, 15) for facilitating gripping of said further exchangeable insert parts (4) in said storage compartments (11).

14. The jaw model as claimed in claim 13, characterized in that each of said exchangeable inserts parts (4) are provided with said locking elements (5) at opposite ends of each of said exchangeable insert parts (4).

15. The jaw model as claimed in claim 13, characterized in that each of said locking elements (5) is formed by a ball and a spring (6) exerting a resilient force on said ball for forcing said ball into a locking depression (7) defined in said recess (3) or in one of said plurality of storage compartments (11).

16. The jaw model as claimed in claim 13, characterized in that said locking elements (5) are formed by rubber buffers (9).

17. The jaw model as claimed in claim 9, characterized in that each of said exchangeable insert parts (4) defines a groove (17), and said recess (3) in said jaw arch defines a guide bead (18), said groove (17) and said guide bead (18) cooperating with each other for adjusting the position of said exchangeable insert part in said recess.

18. The jaw model as claimed in claim 2, characterized in that each of said exchangeable insert parts (4) defines a groove (17), and said recess (3) in said jaw arch defines a guide bead (18), said groove (17) and said guide bead (18) cooperating with each other for adjusting the position of said exchangeable insert part in said recess.

19. The jaw model as claimed in claim 18, characterized in that each of said exchangeable insert parts (4) defines a groove (17), and said recess (3) in said jaw arch defines a guide bead (18), said groove (17) and said guide bead (18) cooperating with each other for adjusting the position of said exchangeable insert part in said recess.

20. The jaw model as claimed in claim 1, characterized in that each of said exchangeable insert parts (4) defines a groove (17), and said recess (3) in said jaw arch defines a guide bead (18), said groove (17) and said guide bead (18) cooperating with each other for adjusting the position of said exchangeable insert part in said recess.

* * * * *

UNITED STATES PATENT AND TRADEMARK OFFICE
CERTIFICATE OF CORRECTION

PATENT NO. : 6,719,562 B1
DATED : April 13, 2004
INVENTOR(S) : Gerd Oestreich

It is certified that error appears in the above-identified patent and that said Letters Patent is hereby corrected as shown below:

Column 2,
Line 26, delete "parts insert parts".
Line 27, delete "different"
Line 29, after "parts", insert -- and --.
Line 33, delete ",".

Column 3,
Line 5, delete "claim 8", and substitute -- claim 9 --.

Column 4,
Line 17, delete "claim 18", and substitute -- claim 8 --.

Signed and Sealed this

Eighteenth Day of May, 2004

JON W. DUDAS
*Acting Director of the United States Patent and Trademark Office*